United States Patent [19]

Miller et al.

[11] 4,019,097

[45] Apr. 19, 1977

[54] CIRCUIT BREAKER WITH SOLID STATE PASSIVE OVERCURRENT SENSING DEVICE

[75] Inventors: Robert C. Miller; George T. Mallick, Jr.; Peter R. Emtage, all of Pittsburgh, Pa.

[73] Assignee: Westinghouse Electric Corporation, Pittsburgh, Pa.

[22] Filed: Dec. 10, 1974

[21] Appl. No.: 531,428

[52] U.S. Cl. .................................. 361/93; 337/35
[51] Int. Cl.² .................. H02H 5/04; H01H 39/00
[58] Field of Search ............... 317/41, 142 TD, 15, 317/14; 337/14, 35; 338/25, 225 D; 307/131

[56] References Cited

UNITED STATES PATENTS

| | | | |
|---|---|---|---|
| 1,210,058 | 12/1961 | Fortescue | 317/41 |
| 1,225,388 | 5/1917 | Woodbridge | 317/41 |
| 3,156,849 | 11/1964 | Epstein | 317/41 |
| 3,287,680 | 11/1966 | Houpt et al. | 317/41 |
| 3,543,104 | 11/1970 | Umeda | 338/225 D |
| 3,745,369 | 7/1973 | Yamagata | 317/41 |
| 3,857,068 | 12/1974 | Braunstein | 317/41 |

*Primary Examiner*—Harold Broome
*Attorney, Agent, or Firm*—Robert E. Converse, Jr.

[57] ABSTRACT

A circuit breaker including a flux transfer trip mechanism and a solid state passive overcurrent sensing device having a temperature-dependent switching resistor of resistance material such as vanadium dioxide or lanthanum cobalt oxide.

11 Claims, 9 Drawing Figures

CIRCUIT BREAKER WITH SOLID STATE PASSIVE OVERCURRENT SENSING DEVICE

BACKGROUND OF THE INVENTION

1. Field of the Invention:

This invention relates generally to electrical apparatus and more particularly to circuit breakers operable to interrupt a circuit upon occurrence of overcurrent conditions.

2. State of the Prior Art:

It is known in the prior art to provide circuit breakers to protect electrical apparatus from damage due to excessive current. Current in excess of the rated current of the circuit breaker will cause it to trip, that is, to interrupt the flow or current to the apparatus. Circuit breakers generally include two types of trip mechanisms to provide two modes of operation under varying conditions. A bimetal element, either directly or indirectly heated, provides the time-current tripping characteristic required for low to moderate overloads. Heat produced in the circuit breaker by the overcurrent condition causes the bimetal to physically deflect, releasing a trip mechanism and opening the circuit breaker contacts. The time required for the bimetal to deflect sufficiently to trip the mechanism is dependent upon the degree of overcurrent.

An instantaneous trip function is provided by an electromagnetic assembly. Under extreme overcurrent conditions, such as short circuits, a magnetic field is generated, attracting an armature to release a mechanism and open the circuit breaker contacts.

The versatility of bimetal elements, however, is limited. Also precise factory adjustment of each circuit breaker is generally required to assure the proper time-current tripping characteristic. When used as a shunt trip element bimetals require large current transformers, increasing the size of the cases of circuit breakers having integral current transformers or requiring external current transformers.

Circuit breakers employing solid-state active electronic circuits are more versatile than circuit breakers employing bimetal elements. Such as circuit breaker is described in U.S. Pat. No. 3,328,639 issued to Carl E. Gryctko. Active semiconductor devices used in such breakers are susceptible to damage from surge voltages, however.

Solid state passive overcurrent devices have been used in the prior art and avoid some of the limitations of bimetal elements and active electronic circuits in trip mechanisms. Devices are described in U.S. Pat. No. 1,210,058 issued to Charles Le G. Fortescue and assigned to the assignee of the present invention, U.S. Pat. No. 2,283,706 issued to Allen Stimson, U.S. Pat. No. 3,156,849 issued to Henry David Epstein, and U.S. Pat. No. 3,172,011 issued to Charles D. Flannagan. The useful life of some prior art devices is limited, however, by a tendency to decompose.

It would be desirable to provide a circuit breaker having a trip mechanism with a solid state passive overcurrent sensing device which is compatible with existing circuit breakers of conventional design, low in cost, easy to manufacture, exhibits greater stability, and has longer life than prior art circuit breakers employing solid state passive overcurrent devices. Since operating personnel are familiar with the time-current tripping characteristic of bimetal elements, it would also be desirable to have a circuit breaker which exhibits similar characteristics.

SUMMARY OF THE INVENTION

In accordance with the principles of the present invention there is provided a circuit breaker comprising separable contacts, a flux transfer trip mechanism operable upon activation to automatically open the contacts, a trip coil operable upon energization to activate the trip mechanism, a temperature-dependent switching resistor connected in series circuit relationship with a trip coil, and a current transformer for supplying electrical current to the switching resistor and trip coil. The current supplied by the current transformer is proportional to current flow through the contacts. Thus, an increase in current flow through the contacts increases the temperature of the switching resistor, and overcurrent condition through the contacts causing sufficient temperature increase and resistance decrease in the resistance material to energize the trip coil, activate the trip mechanism, and open the contacts.

DESCRIPTION OF THE PREFERRED EMBODIMENT

Figure 1:
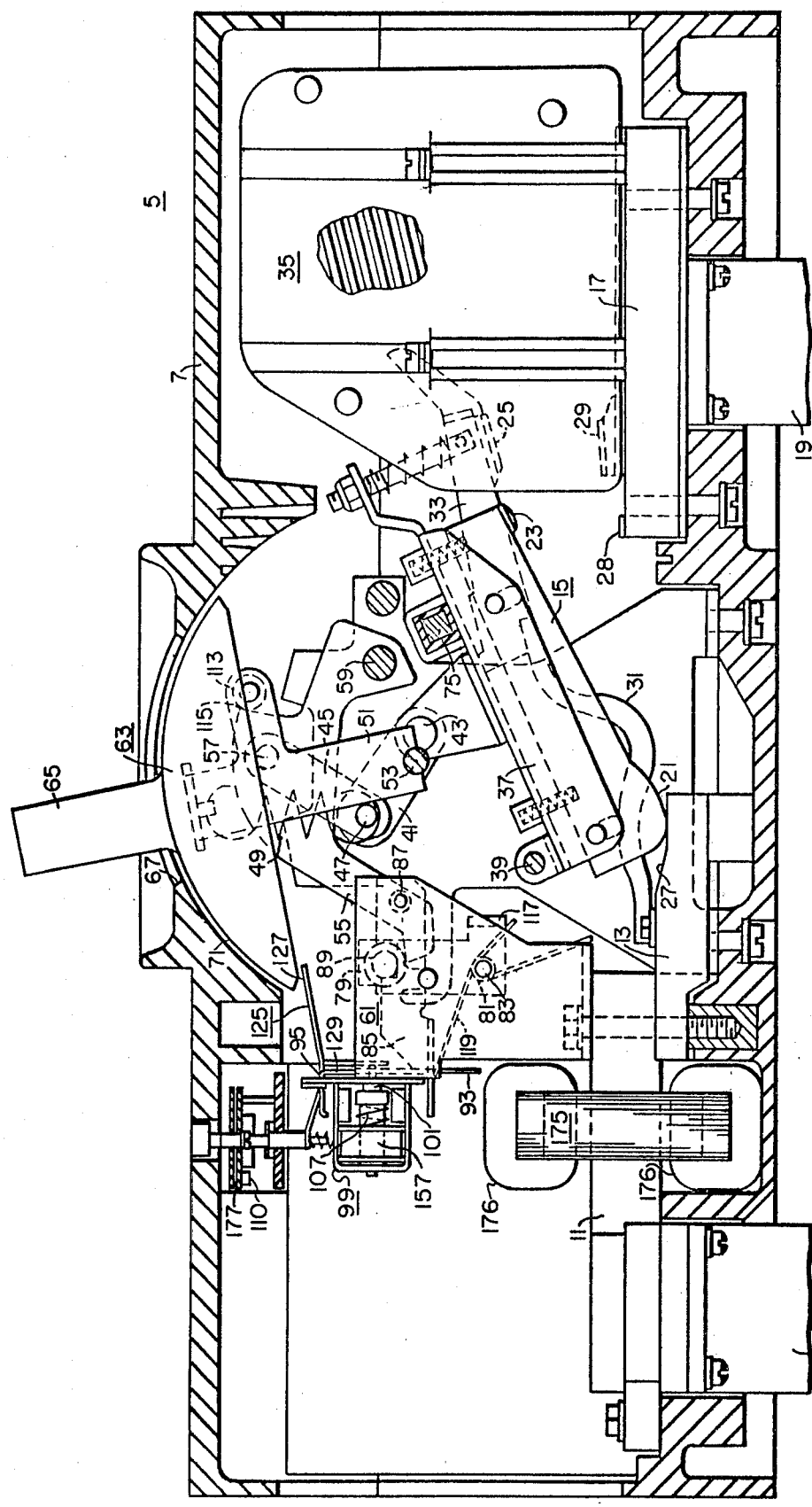
FIG. 1 is a side sectional view, with parts broken away, of the center section of a three-pole circuit breaker constructed in accordance with the principles of the present invention.

Referring to the drawings, there is shown in FIG. 1 the center pole unit of a three-pole molded-case type circuit breaker 5. The circuit breaker mechanism is more specifically described in U.S. Pat. No. 3,808,567, issued to Alfred E. Maier and assigned to the assignee of the present invention. Thus, only a brief description of the circuit breaker mechanism is provided herein. The circuit breaker 5 comprises an insulating housing 7 and suitable barrier means that separates the housing into three adjacent insulating compartments for housing the three pole units of the three-pole circuit breaker in a well-known manner. In the closed position of the circuit breaker a circuit through each pole unit extends from a terminal 9 through a conductor 11, a conductor 13, a movable contact structure indicated generally at 15, a conductor 17, to another terminal 19. Contacts 21, 23 and 25 on the movable contact structure 15 cooperate with stationary contacts 27, 28 and 29 to bridge the conductors 13, 17 in the closed position of the movable contact structure 15. A flexible conductor 13 electrically connects the conductor 13 and a movable contact arm 33, that supports the arcing contacts 25. During opening operations of the movable contact structure 15, the arcing contact 25 separates from the stationary arcing contact 29 last to draw arcs in an arc-extinguishing structure indicated generally at 35. The movable contact structure 15 is supported on a contact carrier 37 that is supported for pivotal movement on a pin 39. A lower toggle link 41 is pivotally connected to the contact carrier 37 at the lower end thereof by means of a pivot pin 43. The lower toggle link 41 is pivotally connected to an upper toggle link 45 by means of a knee pivot pin 47. A pair of overcenter tension springs 49 are connected at the lower ends thereof to the knee pivot 47 of the toggle and at the upper ends thereof to the bight portion of an operating lever 51. The operating lever 51 is an inverted generally U-shaped lever that is supported on the inner ends of the legs thereof for pivotal movement about a pair of pins 53. The upper toggle link 45 is pivotally connected to a releasable member 55 by means of a pivot pin 57. The releasable member 55 is supported for pivotal movement at one end thereof on a pin 59 and is latched at the other end thereof by means of a latch structure indicated generally at 61. A handle structure indicated generally at 63 is connected to the upper end of the operating lever 51 and comprises a handle part 65 that protrudes through an opening 67 in the front of the housing 7 to permit manual operation of the circuit breaker. The handle structure 63 also comprises a shroud part 71 that substantially closes the opening 67 in all positions of the handle structure 63.

The circuit breaker is shown in FIG. 1 in the open position with the releasable trip member 55 latched in the latched position by means of the latch structure 61. In order to close the circuit breaker, the handle 65 is moved in a clockwise direction from the "off" position to an "on" position to move the operating lever 51 clockwise about the pivot 53. During this movement, the springs 47 are moved overcenter to erect the toggle 41, 45 to thereby pivot the movable contact carrier 37 of the center pole unit in a clockwise direction about the pivot pin 39 to move the movable contact structure 15 into the closed position. Since all of the contact carriers 37 of the three pole units are connected for simultaneous movement by means of a rigid insulating tie bar 75, this movement simultaneously closes the contact structures of all three pole units. In order to manually open the circuit breaker, the handle structure 63 is moved counterclockwise to the "off" position seen in FIG. 1. This moves the springs 49 overcenter to cause collapse of the toggle 41, 45 to thereby pivot the three contact carriers 37 about the pivot pins 39 in a counterclockwise direction to the open position shown in FIG. 1.

The free end of the releasable member 55 is engaged under a roller member 79 that is mounted on a first latch member 81 that is pivotally supported on a fixed pivot pin 83. A second latch member 85 is supported for pivotal movement on a pair of aligned pins 87 (only one of which is seen in FIG. 1) and comprises a pair of arms that engage a pair of second rollers 89 that are supported on the first latch member 81 to latch the first latch member 81. A third latch member 93 is supported for pivotal movement about an axis that extends normal to the plane of the paper as seen in FIG. 1 and is indicated at 95. The latch member 81 comprises a window opening that receives a projection on the second latch member 85 to latch the second latch member 85 in the latched position seen in FIG. 1.

A flux transfer trip mechanism indicated generally at 99, described more fully in U.S. Pat. No. 3,783,423 issued to Alfred E. Maier and John A. Wafer and assigned to the assignee of the present invention, is provided to effect tripping operations of the circuit breaker upon the occurrence of an overload current in any of the three pole units of the circuit breaker. The flux transfer trip mechanism 99 comprises an armature 101 and a trip coil 157. The armature 101 is released upon energization of the trip coil 157, causing a spring 107 to move the armature from the initial position seen in FIG. 1 to the actuated or tripping position. During this movement, the armature 101 moves through an opening in the third latch member 93 and engages the third latch member 93 to pivot the third latch member 93 in a counterclockwise direction about the axis 95 thereof. With the circuit breaker in the closed position and the toggle 41, 45 in the erected position the springs 49 are in a charged condition, and movement of the latch member 93 to the unlatching position will release the latch structure 61 to release the releasable member 55 whereupon the charged springs 49 will collapse the toggle 41, 45 to trip the breaker. Upon movement of the third latch member 93 to the unlatched position, the second latch member 85 and the first latch member 81 will be free to move to an unlatched position. The charged springs 49, operating against the releasable member 55 biasing the releasable member 55 in a clockwise direction about the pivot 59, will force the releasable member 55 clockwise to force the first latch member 81 counterclockwise to force the second latch member 85 counterclockwise. The releasable member 55 will move clockwise changing the line of action of the overcenter springs 49 whereupon the springs 49 will collapse the toggle 41, 45 and move the contact carriers 37 of the three pole units to a tripped open position. This movement will move the handle structure 63 to a position intermediate the "on" and "off" positions to provide a visual indication that the circuit breaker has been tripped.

Following a tripping operation, it is necessary to reset and relatch the mechanism before the circuit breaker can be closed. In order to reset the circuit breaker, the handle structure 63 is moved counterclockwise from the intermediate position to a reset position past the "off" position seen in FIG. 1. During this movement, a pin portion 113 on the operating lever 51 engages a shoulder 115 on the releasable member 115 to rotate the releasable member 115 in a counterclockwise direction whereupon the free end of the releasable member engages a part 117 of the first latch member 81 to pivot the first latch member 81 in a clockwise direction about the pivot pin 83 to a reset position whereupon spring means 119 biases the second latch member 85 to the latching position and spring means 121 biases the third latch member 93 to the latching position. During the resetting operation, the handle structure 63 is moved to the reset position, which reset position is almost to the limit of movement of the operating handle structure 63 in the opening 67. During this movement, the shroud 71 on the handle structure 63 engages a reset member 125 that comprises a horizontal arm 127 and a generally vertical arm 129. The reset member 125 is supported for pivotal movement about the axis 95. Upon movement of the handle structure 63 to the reset position, the shroud 71, engaging the arm 127 of the reset member 125, pivots the reset member 125 in a clockwise direction whereupon the arm 129 moves the armature 101 from the actuated or tripping position to the initial or reset position whereupon the magnetic trip actuator is reset. Following a resetting operation, the circuit breaker can be operated in the same manner as was hereinbefore described. The manual, tripping, and resetting operations of the circuit breaker are more specifically described in the above-mentioned U.S. Pat. No. 3,808,567.

Figure 2:
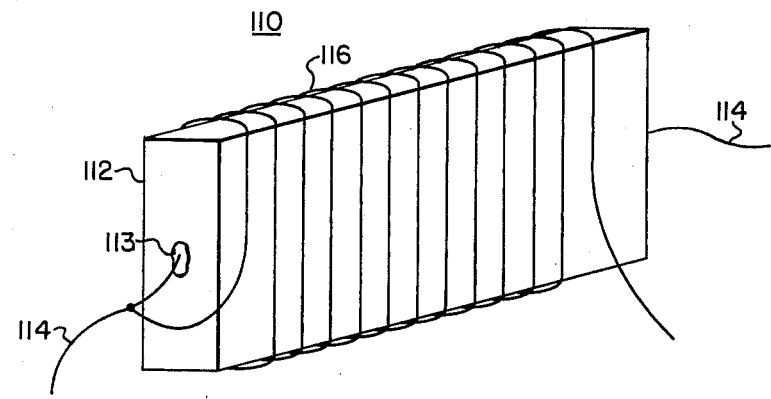
FIG. 2 is a perspective view of the overcurrent sensing device shown in FIG. 1.

In each pole unit of the circuit breaker, a current transformer 175 is disposed around the conductor 11 to monitor the current through that pole of the circuit breaker. The secondary winding 176 of the current transformer 175 is connected in a manner to be hereinafter described to the trip coil 157 and an overcurrent sensing device 110 secured to a mounting board 177. The overcurrent sensing device 110, shown more clearly in FIG. 2, comprises a temperature dependent switching resistor 112, such as vanadium dioxide ($VO_2$). The switching resistor 112 is composed of finely divided particles of vanadium dioxide combined with a fugitive binder, such as the material known commercially as Duco cement, which have been pressed into a rectangular bar at between 2100 and 4200 psi, then sintered. Contacts 113 are applied to the ends of the bar by ultrasonic tinning, and leads 114 soldered to the contacts. A load resistor 116 of resistance wire is wound around the switching resistor 112 and, along with the secondary winding 176, provides a voltage source as input to the switching resistor 112.

Figure 3A:
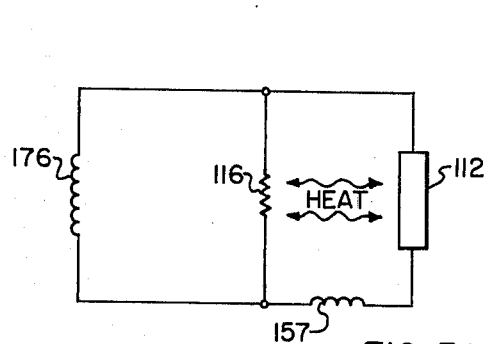
FIG. 3A is a schematic drawing of the secondary of the current transformer, the trip coil, and the overcurrent sensing device of the circuit breaker shown in FIG. 1.

As can be seen in FIG. 3A the switching resistor 112 and trip coil 157 are connected in series, and the combination connected in parallel with the load resistor 116 and the secondary winding 176 of the current transformer 175. When the current flow through the pole of the circuit breaker is at or below rated current the heat dissipated by the overcurrent sensing device 110 is greater than the heat generated by current flow through the switching resistor 112 and the load resistor 116. The temperature and resistance of the switching resistor 112 under these conditions remains substantially constant. This resistance limits the current flow through the series combination of the switching resistor 112 and tripping coil 157 to a value below that required to actuate the flux transfer trip mechanism 99.

When the current flow through the pole of the circuit breaker is above rated current, however, heat produced in the load resistor 116 and switching resistor 112 by increased current developed by the secondary winding 176 is greater than heat dissipated by the overcurrent sensing device 110. Therefore the temperature of the switching resistor 112 beings to rise. At a certain elevated temperature, the resistance of the switching resistor 112 rapidly decreases, thereby permitting sufficient current flow through the series combination of the switching device 112 and the trip coil 157 to actuate the flux transfer trip mechanism 99, causing the circuit breaker to trip in the manner previously described.

Figure 5:
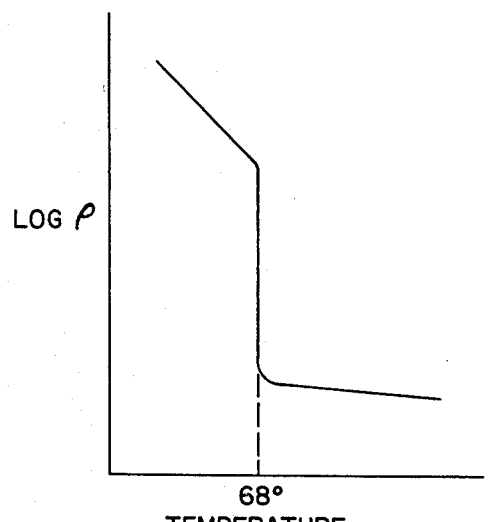
FIG. 5 is a curve illustrating the temperature-resistivity characteristics of vanadium dioxide.

FIG. 5 shows the temperature-resistivity characteristics of vanadium dioxide. As can be seen, the resistivity of vanadium dioxide decreases gradually up to approximately 68° C. At this point there is a sharp drop in resistivity of as much as five order or magnitude for extremely purse samples. Typically, the polycrystalline samples of ordinary purity the ratio of resistivity above and below the transition is approximately 2000:1. This sharp drop in resistivity of vanadium dioxide at a specific temperature provides favorable switching characteristics for the switching resistor 112.

Figure 7:
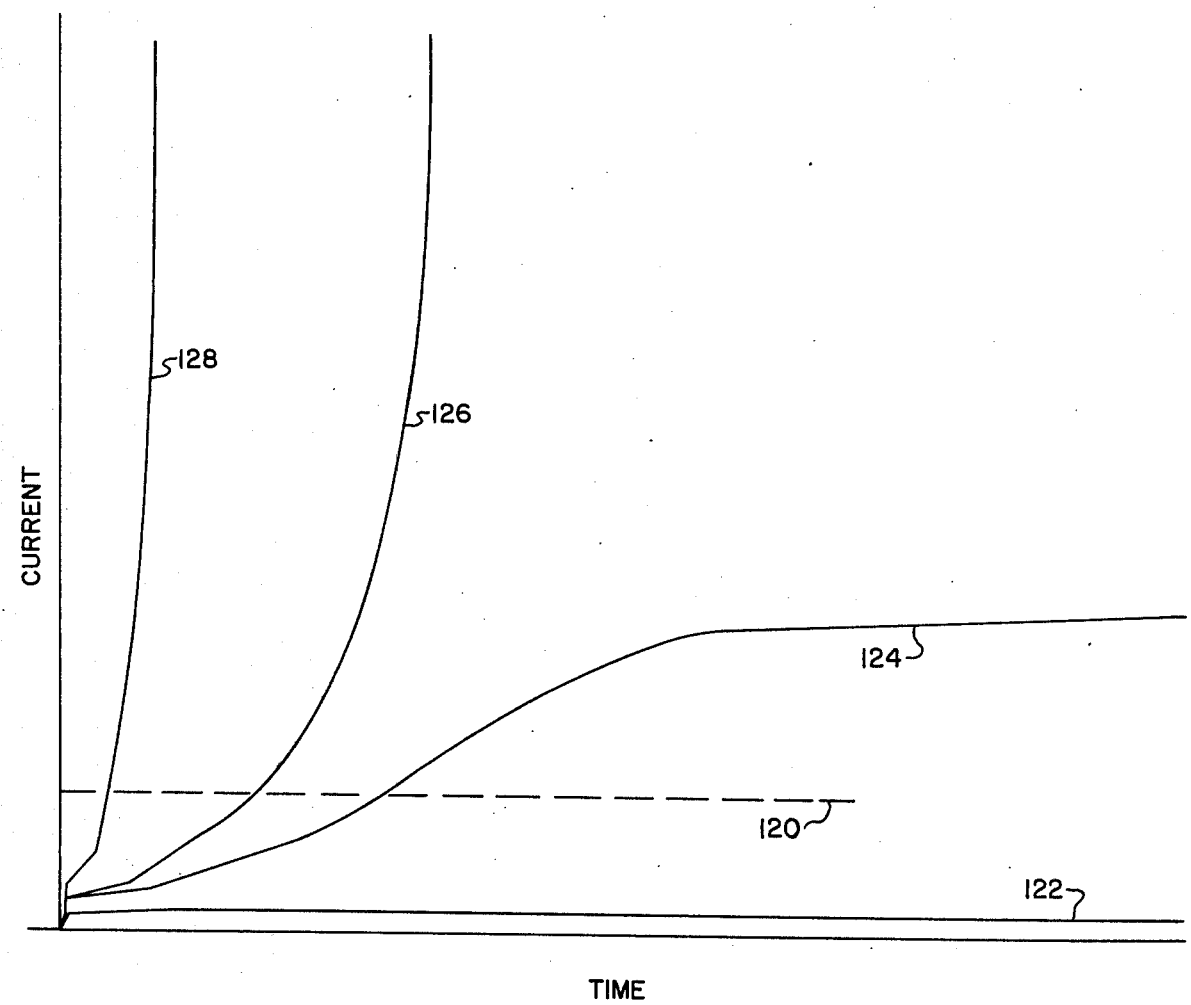
FIG. 7 is a series of curves showing current flow through the switching resistor versus time for various current flows through the circuit breakers.

The time-current characteristics of the overcurrent sensing device 110 are shown in FIG. 7. The dashed line 120 represents the current at which the trip coil 157 will actuate the flux transfer trip mechanism 99. The curve 122 in FIG. 7 represents the time-current characteristics of the overcurrent sensing device 110 for current flow through the circuit breaker below rated current. The current through the overcurrent sensing device 110 remains below the level 120 required to trip the circuit breaker. The curve 124, representing a moderate overload of the circuit breaker 5, shows that after a period of time the current through the overcurrent sensing device 110 rises above the level 120 required to actuate the flux transfer trip mechanism, and the circuit breaker trips. The curve 126 represents a higher overcurrent condition of the circuit breaker 5. As can be seen the circuit breaker will trip after a shorter time period than the moderate overload condition represented by the curve 124. For extreme overcurrent conditions, such as represented by the curve 128, the overcurrent sensing device 110 will cause the circuit breaker to trip very rapidly.

The sharpest switching characteristics of the overcurrent sensing device 110 can be obtained by choosing a value of the load resistor 116 which is low in comparison with the cold resistance of the switching resistor 112. However, it is also desirable to minimize the current requirements of the overcurrent sensing device 110. This can be done by choosing a high value for the resistor 116. Therefore, a compromise must be made between these two requirements. A value for the load resistor 116 of approximately 10% of the cold resistance of the switching resistor 112 will produce sufficiently sharp switching characteristics while at the same time maintaining an adequately low power consumption. An adjustable resistor could be placed in series with the load resistor 116, thereby providing greater flexibility in setting the maximum continuous current rating for the circuit breaker 5.

Figure 3B:
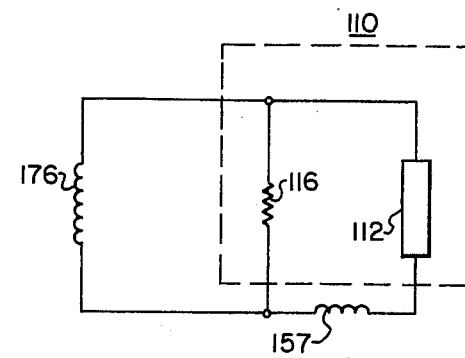
FIG. 3B is a schematic drawing of an alternative embodiment of the invention employing a self-heating overcurrent sensing device.
Figure 3C:
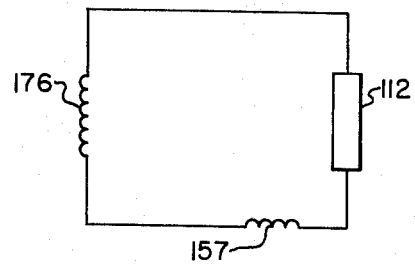
FIG. 3C is a schematic drawing of an alternative embodiment of the invention which does not employ a load resistor.

FIGS. 3B and 3C show alternative embodiments providing different time-current characteristics for the switching resistor 112 under overcurrent conditions. In FIG. 3B the thermal coupling between the load resistor 116 and the switching resistor 112 is eliminated. Decreasing resistance in the switching resistor 112 is caused solely by self-heating thereof. Another time-current characteristic is provided in FIG. 3C by elimination of the load resistor 116. This embodiment is useful for special applications requiring time-tripping characteristics different from conventional circuit breakers.

The time delay characteristics of the overcurrent sensing device are provided thermally; thus they are similar to bimetal time delay characteristics which are familiar to circuit breaker users. However, unlike bimetal trip mechanisms which require precise mechanical positioning and adjustment, the characteristics of the overload current sensing device of the present inventions are determined primarily by thermal and electrical properties of the components. These properties can be closely controlled during manufacture, thus reducing the cost of factory adjustment of circuit breakers prior to sale.

Other types of trip mechanisms could be used; however, the flux transfer trip mechanism 99 can be actuated at very low current level through the trip coil 157. By proper choice of cold resistance of the switching resistor 112 and the load resistor 116 the overcurrent sensing device 110 can be made to perform very effectively at low current levels. This allows the current transformer 175 to be made physically small, thereby decreasing the space required for the mechanism performing the trip function and reducing the cost of the circuit breaker.

Figure 6:
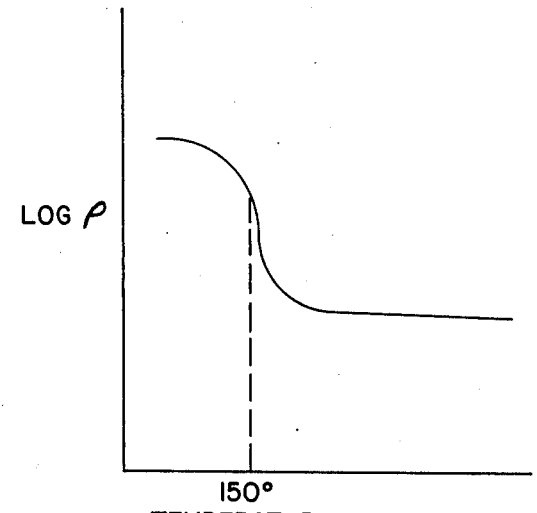
FIG. 6 is a curve illustrating the temperature-resistivity characteristics of lanthanum cobalt oxide.

For circuit breakers to be operated under higher ambient temperature conditions, the switching resistor 112 can be made of material which has a resistance transition at a higher temperature, such as lanthanum cobalt oxide ($LaCoO_3$). The temperature-resistivity characteristics of lanthanum cobalt oxide are shown in FIG. 6. As can be seen, lanthanum cobalt oxide also exhibits a sharp drop in resistivity at a certain temperature, although not as pronounced as vanadium dioxide. However, the temperature at which the transition occurs, 150° C, is significantly higher than that of vanadium dioxide and the ratio of resistivity above and below the transition is sufficient to provide the necessary switching characteristics for the switching device 112.

The useful life of some prior art devices has been limited by a tendency of the resistance material to decompose and lose its negative temperature coefficient of resistance. In materials such as silver sulfide this decomposition manifests itself in the formation of conducting filaments which cause degraded performance. This effect is particularly evident when interruption of direct currents is desired. By use of resistance materials having a negative temperature coefficient of resistance and a high melting temperature, that is, 1000° C or above, the present invention avoids the decomposition problems, providing a useful life greater than prior art devices using silver sulfide, and provides improved performance. As previously described, vanadium dioxide and lanthanum cobalt oxide provide especially favorable switching characteristics, but other materials having a negative temperature coefficient of resistance and a high melting temperature could be used for the resistance material in the switching resistor. Certain other materials could also be used in conjunction with the flux transfer trip mechanism for the temperature dependent switching resistor, including some with positive temperature coefficients; however, other circuit connections would be required.

Figure 4:
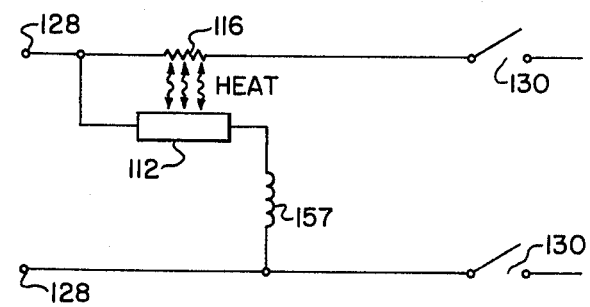
FIG. 4 is a schematic drawing of a trip coil and an overcurrent sensing device of a direct current circuit breaker constructed in accordance with the principles of the present invention.

A circuit breaker using the principles of the present invention can be constructed which is suitable for use in direct current applications. FIG. 4 shows schematically the connections required for a direct current breaker. The series combination of the switching resistor 112 and trip coil 157 are connected across the line terminals 128. The load resistor 116 is electrically connected in series with one side of the line and is placed in physical proximity to the switching resistor 112 to allow heat flow therebetween. It thus functions solely as a heater, as can be seen in FIG. 4, current flowing through the separable contacts 130 also flows through the heating resistor 116. Upon occurrence of overload current through the contacts 130 the resistor 116 generates sufficient heat to lower the resistance of the switching device 112 permitting sufficient current flow through the series combination of the switching resistor 112 and trip coil 157 to actuate the flux transfer trip mechanism 99.

A circuit breaker employing the principles of the present invention can provide the tripping characteristics formerly requiring an instantaneous magnetic trip mechanism and a bimetal thermal trip mechanism. It is mechanically simpler, allowing easier construction and adjustment than the bimetal thermal trip devices formerly employed, thereby providing greater flexibility. Its small size and lower power consumption, thereby allowing smaller current transformers, provide more space within the circuit breaker case and significant cost savings. A circuit breaker employing the principles of the present invention exhibits a longer useful life than prior art devices using silver sulfide. It can be seen therefore that the present invention provides a circuit breaker exhibiting increased performance and significant cost reduction.

What is claimed is:

1. A circuit breaker, comprising:
separable contacts;
a flux transfer trip mechanism comprising a permanent magnet, two magnetic circuits, and a trip coil, said trip coil being operable upon energization to switch magnetic flux produced by said permanent magnet from one of said magnetic circuits to the other to actuate said flux transfer trip mechanism and effect separation of said contacts;
an overcurrent sensing device comprising a temperature-dependent switching resistor connected to said trip coil and switchable between first and second resistance levels, said resistor operable upon switching to said second resistance level to energize said trip coil and actuate said flux transfer trip mechanism; and
current coupling means connected to said contacts, said trip coil, and said temperature dependent switching resistor;
an overcurrent condition through said contacts causing said temperature-dependent switching resistor to switch to said second resistance level and actuate said flux transfer trip mechanism, thereby affecting separation of said contacts.

2. A circuit breaker as recited in claim 1 wherein said current coupling means comprises a current transformer having an input connected to said contacts and an output connected to said trip coil and said temperature dependent switching resistor.

3. A circuit breaker as described in claim 2 wherein said overcurrent sensing device further comprises a load resistor connected in parallel circuit relationship with the output of said current transformer and said temperature-dependent switching resistor.

4. A circuit breaker as described in claim 3 wherein said trip coil is connected in series circuit relationship with said switching resistor.

5. A circuit breaker as described in claim 1 wherein said temperature dependent switching resistor comprises resistance material having a negative temperature coefficient of resistance.

6. A circuit breaker as described in claim 5 wherein said resistance material has a melting temperature of 1000° C or higher.

7. A circuit breaker as described in claim 6 wherein said resistance material comprises vanadium dioxide.

8. A circuit breaker as described in claim 6 wherein said resistance material comprises lanthanum cobalt oxide.

9. A circuit breaker as recited in claim 2 wherein said flux transfer trip mechanism is powered entirely by output current of said current transformer.

10. A circuit breaker as recited in claim 9 further comprising a housing of molded insulating material supporting and enclosing said contacts, said flux transfer trip mechanism, said overcurrent sensing device, and said current transformer.

11. A circuit breaker as recited in claim 1 further comprising a housing of molded insulating material supporting and enclosing said contacts, said flux transfer trip mechanism, said overcurrent sensing device, and said current coupling means.

* * * * *